United States Patent
Khanfouci

(10) Patent No.: US 11,606,256 B2
(45) Date of Patent: Mar. 14, 2023

(54) METHOD FOR PROVIDING NETWORK ORCHESTRATION FOR INDUSTRIAL COMMUNICATION SYSTEM

(71) Applicant: MITSUBISHI ELECTRIC CORPORATION, Tokyo (JP)

(72) Inventor: Mourad Khanfouci, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/626,237

(22) PCT Filed: Jul. 22, 2020

(86) PCT No.: PCT/JP2020/029598
§ 371 (c)(1),
(2) Date: Jan. 11, 2022

(87) PCT Pub. No.: WO2021/033522
PCT Pub. Date: Feb. 25, 2021

(65) Prior Publication Data
US 2022/0263718 A1 Aug. 18, 2022

(30) Foreign Application Priority Data
Aug. 20, 2019 (EP) .................................... 19315097

(51) Int. Cl.
*G06F 15/173* (2006.01)
*H04L 41/0893* (2022.01)
*H04L 41/0897* (2022.01)

(52) U.S. Cl.
CPC ...... *H04L 41/0893* (2013.01); *H04L 41/0897* (2022.05)

(58) Field of Classification Search
CPC .................. H04L 41/0893; H04L 41/0897
(Continued)

(56) References Cited

U.S. PATENT DOCUMENTS

| 2005/0138070 A1* | 6/2005 | Huberman | ............. G06Q 10/10 |
| 2013/0163471 A1* | 6/2013 | Indukuri | ............... G06Q 10/00 370/255 |

(Continued)

FOREIGN PATENT DOCUMENTS

| EP | 3 425 861 A1 | 1/2019 | |
| EP | 3432629 A1 * | 1/2019 | ............ H04W 16/00 |

(Continued)

OTHER PUBLICATIONS

Japanese Office Action for Japanese Application No. 2022-508033, dated Oct. 18, 2022, with English translation.

(Continued)

*Primary Examiner* — Hee Soo Kim
(74) *Attorney, Agent, or Firm* — Birch, Stewart, Kolasch & Birch, LLP

(57) ABSTRACT

A method for providing network orchestration for industrial communication system with multiple network slices, comprising:—calculating centralities of nodes in the industrial communication system;—grouping nodes with similar centralities of nodes into clusters;—selecting cluster head for each cluster that is responsible for the resources allocation for the members of the cluster; and—calculating centrality metric for cluster centralities, so as to orchestrate the industrial communication system.

14 Claims, 4 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2013/0339290 A1* | 12/2013 | Lee ..................... | G06F 17/10 |
| | | | 706/55 |
| 2014/0075002 A1* | 3/2014 | Pradhan ................ | H04L 67/306 |
| | | | 709/223 |
| 2015/0271261 A1 | 9/2015 | Park | |
| 2019/0215795 A1* | 7/2019 | Luecke ................ | H04W 8/005 |
| 2020/0162503 A1* | 5/2020 | Shurtleff ............. | H04L 41/0883 |
| 2022/0369200 A1* | 11/2022 | Fan ..................... | H04W 40/248 |

FOREIGN PATENT DOCUMENTS

| | | | | |
|---|---|---|---|---|
| EP | 3554009 A1 | 10/2019 | | |
| WO | WO 2018/120990 A1 | 7/2018 | | |
| WO | WO-2019015888 A1 * | 1/2019 | ............ | H04W 16/00 |
| WO | WO 2019/104299 A1 | 5/2019 | | |

OTHER PUBLICATIONS

Aarti et al., "Optimal Degree Centrality Based Algorithm for Cluster Head Selection in Wireless Sensor Networks", 2014 Recent Advances in Engineering and computational sciences (RAECS), IEEE, Mar. 6-8, 2014, total 6 pages.

Khanfouci Mourad, "Distributed mobility management based on centrality for dense 5G networks", 2017 European conference on networks and communications (EUCNC), IEEE, Jun. 12, 2017, total 6 pages.

* cited by examiner

METHOD FOR PROVIDING NETWORK ORCHESTRATION FOR INDUSTRIAL COMMUNICATION SYSTEM

TECHNICAL FIELD

The present invention relates network orchestration for industrial communication system (ICS), in particular, the orchestration techniques and architecture for factory automation.

BACKGROUND ART

In an industrial control system in the art, a wireless and eventually wired communication infrastructure as backbone for the communication between the different components of the factory, sensors, actuators and the controller is used.

Such an ICS system contains a plurality of network nodes, for example Wi-SUN nodes and WiFi nodes, as well as a plurality sensors and actuators connected to the network nodes. Some network nodes collect sensor information and transmit it to a gateway that acts as data collector and transmit it to a controller. Other nodes, eventually transmit the commands from the controller to the actuators in the network. In this case, there is typically coexistence between two network slices in the ICS system, URLLC (Ultra-reliable low-latency communication) network slice for the transmission of the controller commands and ultra dense JOT for the data collection from the sensors.

In the art, an important aspect in the design of such industrial networks is the medium access control strategies in the ICS systems. A typical medium access control strategies comprises the following strategies:

Contention based medium access (MAC) strategy where the nodes compete for the resources, Schedule based access strategy where an access schedule is defined for the nodes that minimize the packet collisions that are inherent to the contention based strategy.

The contention based medium access control has flexibility to topology change, i.e. the addition/removal of the nodes but this advantage comes at the expense of additional interference in the network that is due to the collision between the packets of the different nodes. On the other hand, the schedule based strategies, i.e. TDMA/FDMA that defines time/frequency transmission schedule for the transmission of the nodes, is less flexible. In fact, centralized planning is needed for the schedule based which results in low flexibility, i.e. the planning is repeated each time new nodes is added/removed to/from the network.

In this regard, the state of the art of industrial networks with wired and wireless access applies the contention based MAC strategy to the wireless networks part of the ICS and TDMA/FDMA MAC strategies for the wired networks part of the ICS. In the art, the orchestration process of the ICS consists of defining the routing and management processes, i.e. the access strategy, their related planning parameters such as the backoff of the contention based strategies and time slots allocation for the TDMA/FDMA systems and the routing and eventually the frequency allocation of the wireless networks in case of heterogenous deployments. Therefore, the state of the art orchestrator is centralized that receives information from the industrial network and builds a control plane for the backbone network, i.e. forwarding rules in the different nodes of the industrial network as well as the access and transmission policies of the nodes.

Traditional MAC techniques for factory automation consist of combining the contention based MAC in the wireless parts of the ICS and schedule based MAC (TDMA) in the wired parts of the ICS. However, the orchestration of such traditional MAC techniques implies the joint planning of contention and schedule based medium access techniques which lead to complex and not scalable management since the TDMA timeslots should be re-planned each time the topology of the network changes. Moreover, the design of the backbone network involves complex techniques based on group Steiner trees routing.

Therefore, when the contention based MAC is selected, the delay of data collection as well as the delay of transferring the control command to the actuators is increased. When schedule based MAC is selected, the overall orchestrator will not be flexible since the resources and various parameters of the schedule based systems should be adapted to take into account the addition of new nodes. From the backbone design and orchestration principles, it is well known that finding the optimum minimum Steiner tree is a complex operation.

SUMMARY OF INVENTION

The invention aims to improve the situation.

In this regard, according to one aspect of the invention, it is provided a method for providing network orchestration for industrial communication system (ICS) with multiple network slices, comprising:

calculating centralities of nodes in the industrial communication system;

grouping nodes with similar centralities of nodes into clusters;

selecting cluster head for each cluster that is responsible for the resources allocation for the members of the cluster; and calculating centrality metric for cluster centralities, so as to orchestrate the industrial communication system.

With such a method, the orchestration of ICS systems is optimized. On the one hand, we may achieve optimization objective of fast sensor data collection through nodes with eventually multiple technologies, in particular, fast congestion avoidance routing of high number of sensor data packets towards the gateway. On the other hand, we may also achieve optimization objective of fast transmission of actuator commands, in particular, transmitting the commands through paths with ultra low latency. The paths are eventually formed by nodes with different technologies.

In an embodiment, the method according to the present invention further comprises:

allocating resource to the clusters based on the calculated centrality metric;

and coordinating transmissions between nodes of each cluster.

With such an arrangement, nodes are clustered so as to reduce the collision between the transmission of the packets from the sensors or towards the actuators.

Alternatively, grouping nodes with similar centrality into clusters comprises using K-means technique to cluster the nodes based on their centralities, wherein K-means calculate local mean of the betweenness centralities in the cluster, the node is added to the cluster if its betweenness centrality is close to the local mean centrality of the cluster.

Alternatively, the cluster centralities according to the method of the present invention are calculated as:

mean of the betweenness centrality of the nodes of cluster;

betweenness centrality of the node with the maximum closeness centrality to the nodes of the cluster;
betweenness centrality of the cluster head; and/or
betweenness centrality of the node connected to the neighboring cluster.

In this case, the cluster centralities can be calculated in various ways so as to facilitate the calculation.

Alternatively, the resource according to the method of the present invention comprises:
- transmission slots for data collection and/or control command transmission;
- power and frequency resource blocks that corresponds to OFDM systems;
- antennas that corresponds to space diversity resources; and/or
- maximum Bakeoff and other parameters of CSMA/CA (Carrier Sense Multiple Access with Collision Avoidance) medium access control such as energy detection ED parameters, wherein the node is detected if it is received with enough energy.

In this regard, various resources can be taken into consideration so as to facilitate the resource allocation.

Alternatively, allocating resources to the clusters based on the calculated centrality metric comprises selecting different transmission bands and bandwidths for clusters with different centralities, wherein higher transmission bandwidths for more central nodes in order to mitigate the congestion during the data collection from the sensors.

Alternatively, the coordinating transmissions between nodes of each cluster further comprises:
- transmitting coordination information, by the cluster head, to the nodes, and using the coordination information, by the nodes, to coordinate the transmission with the other nodes of the cluster;
- evaluating local, by the cluster head, in cluster, centrality of each of its nodes and transmit coordination information based on this local centrality to the nodes in order to coordinate their transmission; and
- obtaining a common coordination parameter, by the nodes within each cluster, and using this common parameter for coordinating the transmission in the cluster, wherein the common parameter is for example a common time/frequency reference that will be used to perform time division multiple access transmission (TDMA).

Therefore, transmissions between nodes of each cluster are coordinated in a more efficient manner.

In another embodiment, the centralities of nodes according to the method of the present invention are characterized by the betweenness centrality formula:

$$B(v) = \sum_{i,j \neq v} \frac{\sigma_{i,j}(v)}{\sigma_{i,j}}$$

wherein $\sigma_{i,j}$ is defined by the number of shortest paths from the node i to the node j of the industrial communication system, and $\sigma_{i,j}(v)$ is defined by the number of shortest paths for which the node v of the industrial communication system is contributing to.

In another embodiment, the centralities of nodes according to the method of the present invention are characterized by the following closeness centrality formula:

$$C_D(v) = \sum_{i \in N(v), i \neq v} \frac{1}{d_{v,i}}$$

wherein variable $d_{v,i}$ is the distance between the node v and the node i from the set N(v), and a node v with high closeness centrality is a node that is not at the border of the set N(v) and that have small distances to every other node in the set N(v).

In another embodiment, the centrality metric is a product of betweenness and closeness centralities of nodes, characterized by the following formula:

$$\lambda(v) = B(v) C_D(v).$$

In yet an embodiment, the method according to the present invention further comprises:
- obtaining the centrality metric that characterizes the centrality of the terminal set P that is the set of the selected cluster heads;
- selecting Steiner node having a high value of the centrality metric;
- adding connection with the lowest latency between the Steiner node and the terminal node which is the node from the terminal set P to the Steiner tree and adding the Steiner node to the terminal nodes; and
- testing if the constructed tree is spanning the network.

Alternatively, the Steiner node having the high value of the centrality metric contains a high betweenness centrality and is close to all the non terminal nodes, which means the nodes of the network that are not in the terminal set P.

Furthermore, the betweenness centrality is characterized by the following formula:

$$B(v) = \sum_{w:v \in P_s(w)} \frac{\sigma_{sv}}{\sigma_{sw}}(1 + \delta_s(w))$$

where the parameter $P_s(w)$ is the set of direct predecessors set of a given node w towards the sink node and it is obtained by graph traversal techniques which are for example breadth first graph traversal technique (BFS) or depth first search (DFS). These traversal techniques determine the number of shortest paths between any couple of nodes in the industrial communication system; and $\sigma_{sv}$ and $\sigma_{sw}$ are respectively the number of shortest paths from the node v and w to the node s of the network and $\delta_s(w)$ is the cumulative centrality metric of the node w on the path from a source s that is, for example, defined as "0" if the node w is a source, i.e. sensor or target, i.e. actuator.

The centrality metric is characterized by the following formula:

$$\lambda(v) \approx \sum_{\substack{w:v \in P_s(w) \\ w \in N(v)}} \frac{\sigma_{sv}}{d(v,w) \sigma_{sw}}(1 + \delta_s(w))$$

where d(v,w) is the distance between the nodes v and w in the network.

With such arrangements, the backbone network between the clusters is optimized such that the delay to the transmission to/from the gateway are minimized.

According to another aspect of the invention, it is also provided an orchestrator for providing network orchestration for industrial communication system (ICS) with multiple network slices, being configured to:
- calculate centralities of nodes in the industrial communication system;
- group nodes with similar centralities of nodes into clusters;

select cluster head for each cluster that is responsible for the resources allocation for the members of the cluster; and calculate centrality metric for cluster centralities, so as to orchestrate the industrial communication system.

According to yet another aspect of the invention, it is further provided an industrial communication system with multiple network slices, comprising the abovementioned orchestrator.

Therefore, the present invention proposes a solution to the problem of the optimization of the ICS system with multiple network slices by proposing centrality based orchestration techniques for the radio access of the ICS system. The key idea of the invention is to use the centrality of the nodes in the ICS to form clusters that coordinate their access and transmission and to build up backbone interconnecting the clusters with low latency. Nodes with the same centrality in the ICS are clustered into the same cluster and new Steiner tree design based on combined betweenness and closeness centrality is proposed.

Thanks to the present invention, these components of the orchestration system improve the overall scalability and reduce the complexity of the management in the ICS.

Other features and advantages of the present invention will appear in the description hereinafter, in reference to the appended drawings.

DESCRIPTION OF EMBODIMENTS

Figure 1:
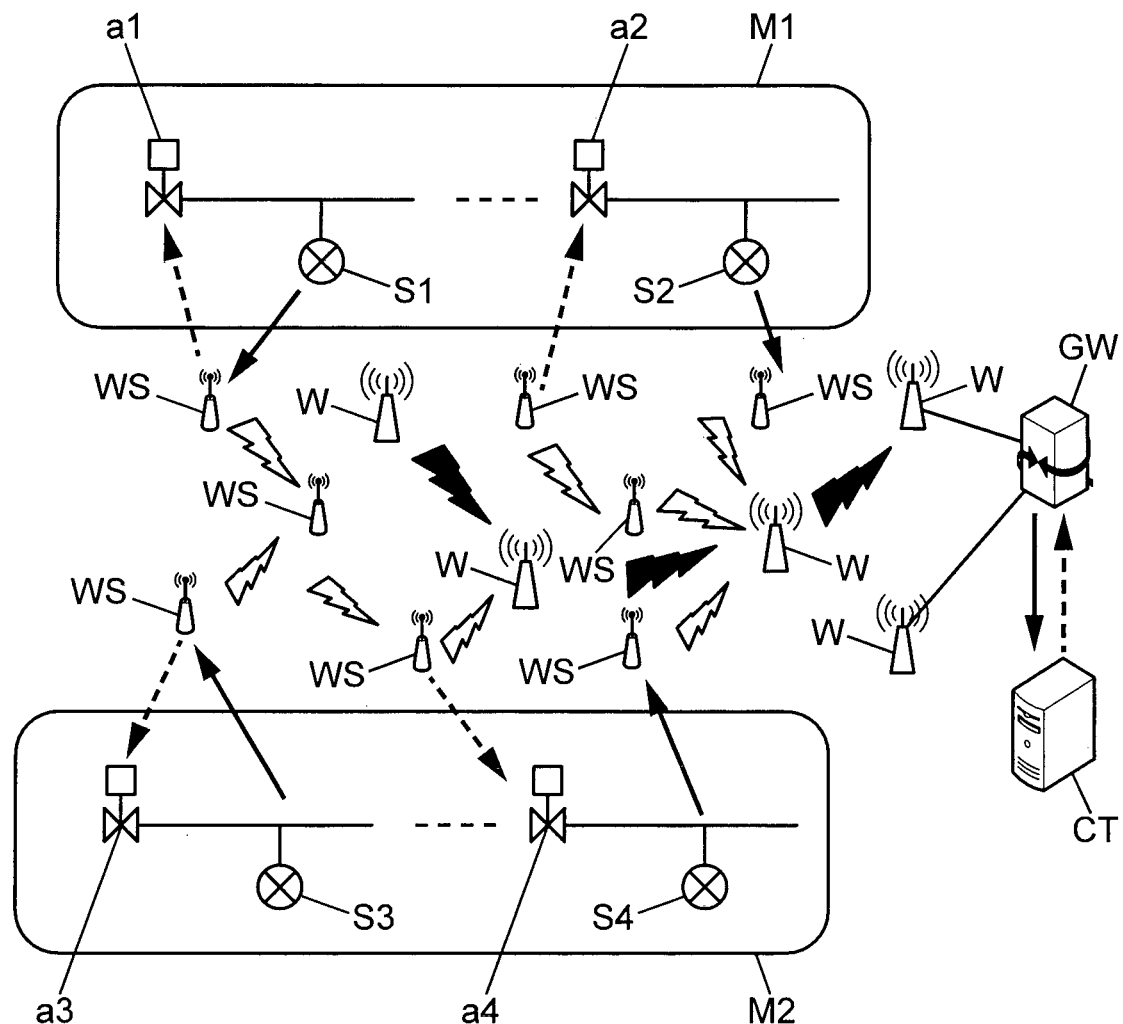
FIG. 1 illustrates an industrial control system according to the present invention.

FIG. 1 shows schematically an industrial communication system (ICS) including a number of industrial sensors s1 to s4 and actuator a1 to a4 that can emit or receive wireless data, wherein the sensors s1, s2 and the actuator a1, a2 are installed on machine M1, and the sensor s3, s4 and the actuator a3 and a4 are installed on machine M2, a number of wireless nodes, such as Wi-SUN ws1 to ws8 and WiFi nodes w1 to w8, for example operating under 900 MHz under IEEE 802.15.4 standard or 2.5 GHz under IEEE 802.11 standard, as well as a gateway GW and a controller C. Wherein the wireless nodes can receive the wireless data from the sensor and send it to the gateway GW, and the gateway GW can transmit it to the controller C. On the other hand, the controller C can send command to the gateway, which then transmits it to the wireless nodes, and then the wireless nodes transmit it to the actuator. The wireless data can also be transmitted among the wireless nodes.

In this exemplary ICS system, there is coexistence between two network slices in the ICS system, URLLC (Ultra-reliable low-latency communication) network slice for the transmission of the controller commands and ultra dense IOT for the data collection from the sensors. In fact, this is merely an example, and there could be coexistence between multiple network slices with more than two slices as shown in the present example.

With more and more multiple network slices when the system containing more sensors and actuator, as well as other possible devices in the ICS, an orchestration problem for ICS should be addressed by the present invention, on the one hand, to reduce the collision between the transmission of the packets from the sensors or towards the actuators, and on the other hand, to minimize the delay to the transmission to/from the gateway.

According to the present invention, an exemplary orchestration process is viewed as a combined clustering and backbone network construction and/or adaptation in order to reduce the overall latency and interference in the ICS system. The overall orchestration method according to the invention is now described hereinafter.

Before the orchestration process, each node in the ICS system of FIG. 1 is measuring the signals it receive from the neighboring nodes with specific power/quality or any other metric that characterizes the ability that two nodes are having to communicate. These measurements can be the measurements of the nodes, eventually inter-frequency measurement when multiple technologies are used in the ICS system. These measurements are collected in the abstraction layer of the ICS system and are used to build a representation of the connectivity situation.

Figure 2:
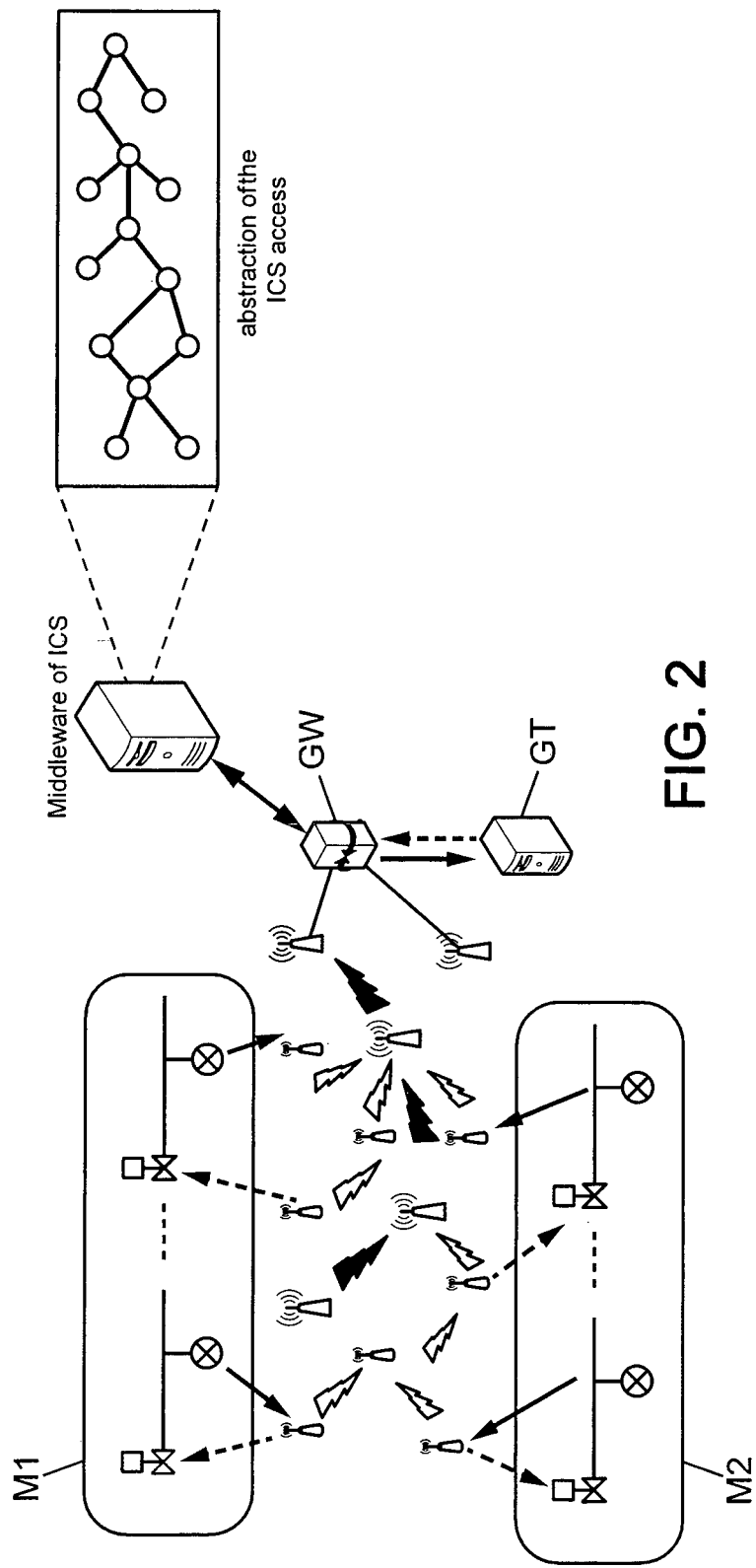
FIG. 2 illustrates an abstraction of the ICS connectivity.

As shown in FIG. 2, an abstract model is stored in the abstraction layer/middleware of the ICS and is defined as: a node that represents a specific communication device in the ICS system and edges connecting nodes represents the communication link between the nodes or interference from one node to another.

Figure 4:
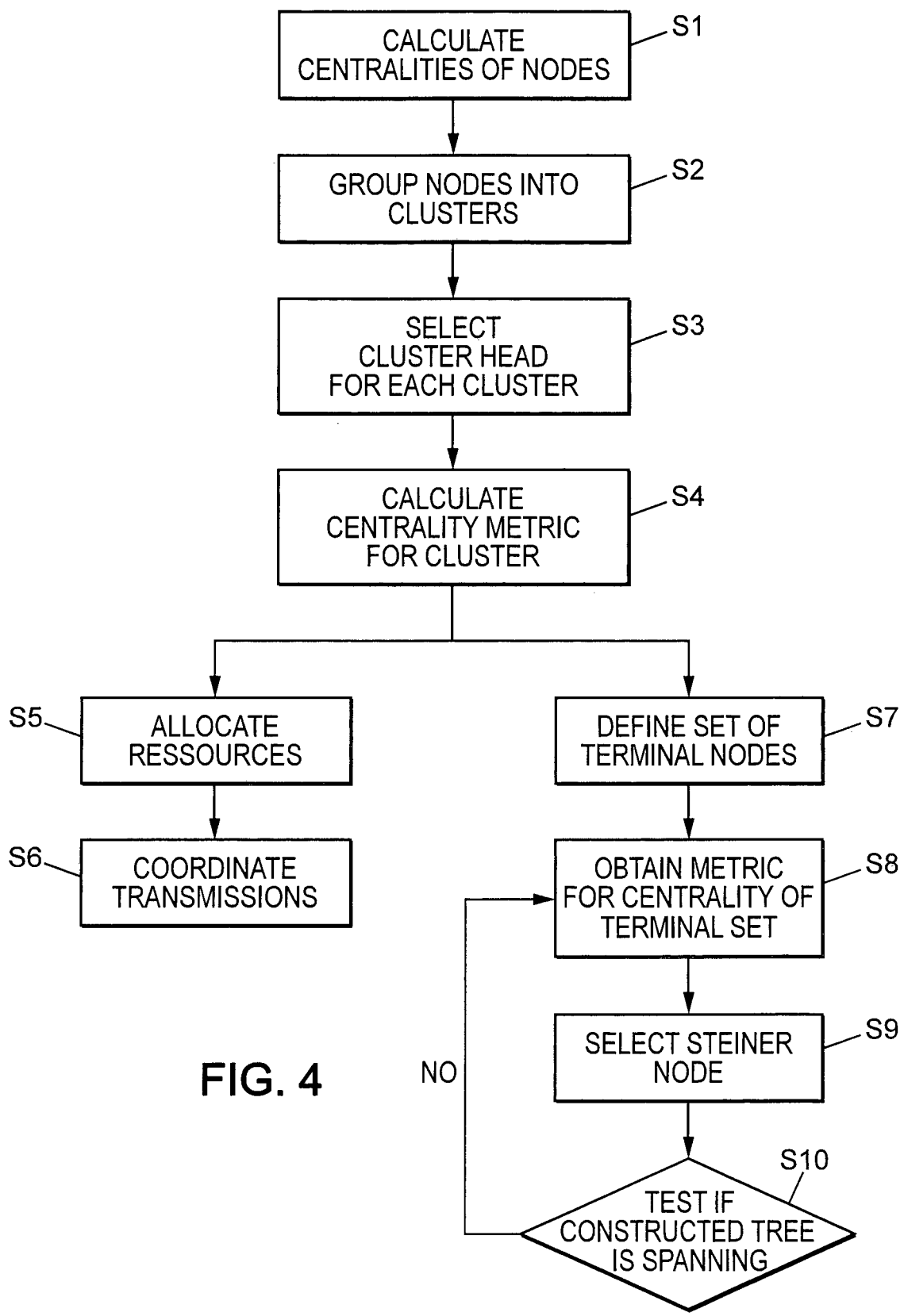
FIG. 4 is a flowchart of an illustrative method according to the invention.

In case the ICS is having multiple network slices, the abstraction may be either on per slice basis, i.e. an abstraction is built for the communication and/or interference situation in each slice or on a global network basis, i.e. considering the slices that can communicate with each other or that can interfere in building the abstraction. In this last case, the contribution of the node of the ICS to multiple network slices is implicitly included in the centrality calculation in the later orchestration process, especially step S1 as shown in FIG. 4, that will be detailed below.

Several metrics regarding the centrality calculation can be considered in the present invention. For instance, a first exemplary metric is the contribution of each communication device to a path of a data packet in the ICS network. Let us define the number of shortest paths from the node i to the node j of the ICS as $\sigma_{i,j}$. The number of shortest paths for which the node v of the ICS is contributing to is-defined as $\sigma_{i,j}(v)$.

The metric that characterizes the contribution of the node to the paths towards the gateway is given by the following betweenness centrality formula:

$$B(v) = \sum_{i,j \neq v} \frac{\sigma_{i,j}(v)}{\sigma_{i,j}}$$

Nodes with high betweenness centrality are nodes that are contributing to a high number of paths of low latency in the network.

A second exemplary metric used in the present invention is closeness centrality metric where for the node v the closeness centrality of the node with respect to nodes in a set N(v) around the node v. This closeness centrality is defined as the following:

$$C_D(v) = \sum_{i \in N(v), i \neq v} \frac{1}{d_{v,i}}$$

The variable $d_{v,i}$, is the distance between the node v and the node i from the set N(v). A node v with high closeness centrality is a node that is not at the border of the set N(v) and that have small distances to every other node in the set N(v).

After obtaining these centralities, orchestration process is proceeded as follows:

First, in step S2, the nodes with similar centralities of nodes are grouped into clusters. In particular, the nodes are clustered into groups that have similar contribution to the path from the sensor towards the gateway, for example, nodes similar betweenness centralities.

Figure 3:
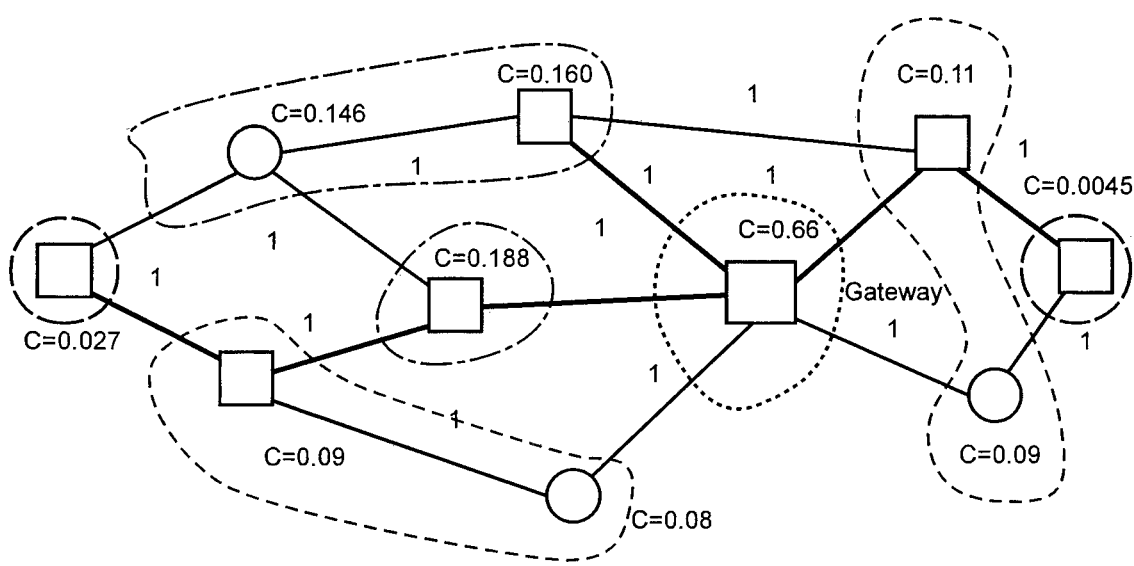
FIG. 3 illustrates clusters grouped from nodes in ICS system.

FIG. 3 illustrates such a cluster, wherein each node has its own node centrality C and those with similar centrality are grouped together as one cluster.

As an example, K-means technique may be used to cluster the nodes based on their centralities. K-means calculate local mean of the betweenness centralities in the cluster, the node is added to the cluster if its betweenness centrality is close to the local mean centrality of the cluster.

In addition, we may determine from the measurements of the nodes, the clusters and commands the nodes independently to join the clusters.

After the node clustering step, a cluster head is selected for each cluster in step S3. The cluster head is a specific node of the industrial communication system that is usually central in the cluster. For example, the head can be a node that communicates with low latency with the cluster members or it is contributing to communication paths between any pairs of nodes of the cluster.

The cluster head is adapted for transmission coordination in the cluster. For example, the cluster head node is timing reference for time division multiple access transmission (TDMA) between the nodes of the cluster. Another example is that the cluster head performs the coordination between the transmissions in the cluster by sensing the radio channel and sending clear to send (CTS) packets to the nodes of the cluster in carrier sense multiple access CSMA with collision avoidance, CA scheme.

The cluster head is responsible for the later resources allocation for the members of the cluster. This resource allocation scheme is for example, the selection of the slots, the frequencies, the powers or any other radio network resources for the transmission of the nodes of the cluster. Resource allocation is also viewed as a way to provision resources for the transmission of the nodes of the cluster that minimizes the interference.

Afterwards, centrality metric for cluster centralities is calculated in step S4, so as to orchestrate the industrial communication system. As an example, the cluster centrality can be calculated by means of:

The mean of the betweenness centrality of the cluster;

The betweenness centrality of the node with the maximum closeness centrality to the nodes of the cluster, The betweenness centrality of the cluster head; and/or, The betweenness centrality of the node connected to the neighboring cluster.

For example, wherein the centrality metric is a product of betweenness and closeness centralities of nodes, characterized by the following formula:

$$\lambda(v)=B(v)C_D(v).$$

If the node v is having high centrality, it will have high value of the parameter $\lambda(v)$.

On the one hand, in order to mitigate possible congestion during the data collection process/control command transmission process, the following steps are implemented.

In step S5, resources are allocated to the clusters based on cluster centrality such that more resources are allocated to central clusters during the data collection process/control command transmission process. These resources may be for example:

Transmission slots for data collection and/or control command transmission;

Power and frequency resource blocks that corresponds for example to OFDM systems;

Antennas that corresponds to space diversity resources. More antennas can be allocated to nodes with higher betweenness centrality;

Maximum Bakeoff and other parameters of CSMA/CA medium access control such as energy detection ED parameters;

Different transmission bands and bandwidths can be selected for the clusters with different centrality. It selects higher transmission bandwidths for more central nodes in order to mitigate the congestion during the data collection from the sensors. The transmission bands are selected to minimize the interference of the transmission between the clusters. Different transmission bands are selected for the transmission of the clusters with different centralities.

Accordingly, in step S6, transmission is coordinated between the nodes of each cluster as the following:

Cluster head transmit coordination information to the nodes and the nodes use this information to coordinate the transmission with the other nodes of the cluster.

The cluster head evaluate local, in cluster, centrality of each of its nodes and transmit coordination information based on this local centrality to the nodes in order to coordinate their transmission. The coordination may be done as: nodes with similar centralities in the cluster transmit in a coordinated way.

The nodes within each cluster obtain a common coordination parameter, through consensus averaging and use this common coordination parameter for coordinated transmission in the cluster.

With these arrangements in steps S5 and S6, nodes are clustered so as to reduce the collision between the transmission of the packets from the sensors or towards the actuators.

On the other hand, in order to improve the reactivity of the centrality calculation and improve the monitoring/management latency of the orchestration, the present invention also proposes a method for the inter cluster backbone network.

State of the art backbone network construction is based on Steiner tree problem and algorithms. In its simplest form, the minimum Steiner tree problem may be formulated as: given a set P of n pins or terminal nodes, we would like interconnect these points using a minimum total amount of wire. The minimum Steiner tree problem consists of introducing a set of intermediary points S outside the set P such that the tree spanning the set P u S is a minimum spanning tree, i.e. a tree with minimum sum of metric.

For this reason, Steiner tree is the basic component of the design of the backbone network for ICS. The optimal solution of the Steiner tree problem is non polynomial and hard (NP-hard). An exact algorithm is given by the Dreyfus-Wagner recursion. This algorithm is a dynamic programming algorithm that augments iteratively the Steiner tree by adding the nodes v and u to the terminal nodes P and that minimize the following:

$$ST(P,v)=\min_{v \in P}(dist(v,u)+\min_{X \subseteq P}(ST(X,u)+ST(P \backslash X, u)))$$

where ST(P,v) is the sum of the metrics of the Steiner tree over the nodes P∪{v}. The set X is a partition of the terminal nodes and P\X is a complementary set of the partition X in the set P. The function dist(v,u) is the latency of the transmission between the node v and u and ST(P,v) is the sum of the latencies in the Steiner tree. The node u is a node that is on the path between the node v and the set of terminals P and with degree above 3.

One of the key drawbacks of this approach in the art is the lack of scalability when the network is large. In this regard, the present invention proposes another approximation, based on the following method that starts from clusters with low centrality and move to clusters with high centrality:

S7: Start from the set of terminals P that is the set of the previously determined cluster heads;

S8: Obtain a metric that characterizes the centrality of the terminal set P. The metric can be for example, the average centrality of the terminal set, the maximum centrality of the terminal set or any other metric that characterizes the contribution of the cluster heads to the paths of the packets in the ICS system;

S9: Select Steiner node that is having a high betweenness centrality and that is close to all the non-terminal nodes (X\P), i.e. nodes with high value of the indicator $\lambda(v)=B(v) C_D(v)$ and that is neighbour to at least one terminal node. Add the connection with the lowest latency between the Steiner node and the terminal node to the Steiner tree and add the Steiner node to the terminal nodes;

S10: Test if the constructed tree is spanning the network. If not, go to step S8.

The basic advantage of using the metric $\lambda(v)$ for finding the Steiner nodes of the backbone network is the local dependency of this metric with respect to the case of the network wise betweenness centrality metric B(v).

It is well known by the Brands algorithm that the betweenness centrality is given by the following recursive relation $$B(v) = \sum_{w:v\in P_s(w)} \frac{\sigma_{sv}}{\sigma_{sw}}(1 + \delta_s(w))$$

This metric serves for the addition of the new Steiner nodes for the backbone construction will consider only a local nodes in the neighbourhood of the considered node, instead of all network nodes. This will improve the scalability of orchestration for ultra-dense networks and the latency of the backbone construction.

One of the advantages of the proposed metric is related to the monitoring and management of the centrality metric $\lambda(v)$. The standard Brands algorithm needs to monitor and propagate the accumulated centrality metrics $\delta_s(w)$ to the node v from all the network nodes w such that $v \in P_s(w)$, i.e. v is at the intersection of the shortest paths from some w nodes in the network. The algorithm according to the present invention proposes to reduce the centrality calculation to a neighborhood N(v) around the node v that improves the reactivity of the centrality calculation and improve the monitoring/management latency of the orchestration.

With these arrangements, the backbone network between the clusters is optimized so that the delay to the transmission to/from the gateway is minimized.

According to another aspect of the present invention, it also proposes an orchestrator for providing network orchestration for ICS with multiple network slices by implementing the process mentioned above.

In summary, the key idea of the invention is to propose a single metric for both for the clustering and the backbone optimization that reduces the complexity of the orchestration and improve the overall system performance, so as to achieve latency and jitter optimization, simple management thanks to clustering.

In addition, as is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

The invention claimed is:

1. A method for providing network orchestration for industrial communication system (ICS) with multiple network slices, comprising:
   calculating centralities of nodes in the industrial communication system;
   grouping nodes with similar centralities of nodes into clusters;
   selecting cluster head for each cluster; and
   calculating centrality metric for cluster centralities, so as to orchestrate the industrial communication system,
   wherein the cluster centralities are calculated as:
   mean of the betweeness centrality of the nodes of cluster;
   betweeness centrality of the node with the maximum closeness centrality to the nodes of the cluster;
   betweeness centrality of the cluster head; and/or
   betweeness centrality of the node connected to the neighboring cluster.

2. The method according to claim 1, wherein it further comprises:
   allocating resource to the clusters based on the calculated centrality metric; and
   coordinating transmissions between nodes of each cluster, wherein that the cluster head is responsible for the resources allocation for the members of the cluster.

3. The method according to claim 2, wherein grouping nodes with similar centrality into clusters comprises:
   using K-means technique to cluster the nodes based on their centralities.

4. The method according to claim 2, wherein the resource comprises:
- transmission slots for data collection and/or control command transmission;
- power and frequency resource blocks that corresponds to OFDM systems;
- antennas that corresponds to space diversity resources; and/or
- maximum Bakeoff and other parameters of CSMA/CA medium access control such as energy detection ED parameters.

5. The method according to claim 2, wherein allocating resources to the clusters based on the calculated centrality metric comprises:
- selecting different transmission bands and bandwidths for clusters with different centralities, wherein higher transmission bandwidths for more central nodes in order to mitigate the congestion during the data collection.

6. The method according to claim 2, wherein coordinating transmissions between nodes of each cluster comprises:
- transmitting coordination information, by the cluster head, to the nodes, and using the coordination information, by the nodes, to coordinate the transmission with the other nodes of the cluster;
- evaluating local, by the cluster head, in cluster, centrality of each of its nodes and transmit coordination information based on this local centrality to the nodes in order to coordinate their transmission; and
- obtaining a common coordination parameter, by the nodes within each cluster, and
- using the common parameter for coordinating the transmission in the cluster.

7. The method according to claim 1, wherein the centralities of nodes are characterized by the betweeness centrality formula:

$$B(v) = \sum_{i,j \neq v} \frac{\sigma_{i,j}(v)}{\sigma_{i,j}}$$

wherein $\sigma_{i,j}$ is defined by the number of shortest paths from the node i to the node j of the industrial communication system, and $\sigma_{i,j}(v)$ is defined by the number of shortest paths for which the node v of the industrial communication system is contributing to.

8. The method according to claim 1, wherein the centralities of nodes are characterized by the following closeness centrality formula:

$$C_D(v) = \sum_{i \in N(v), i \neq v} \frac{1}{d_{v,i}}$$

wherein variable $d_{v,i}$ is the distance between the node v and the node i from the set N(v), and a node v with high closeness centrality is a node that is not at the border of the set N(v) and that have small distances to every other node in the set N(v).

9. The method according to claim 7, wherein the centrality metric is a product of betweeness and closeness centralities of nodes, characterized by the following formula:

$$\lambda(v) = B(v)C_D(v).$$

10. The method according to claim 1, wherein it further comprises:
- obtaining the centrality metric that characterizes the centrality of the terminal set P that is the set of the selected cluster heads;
- selecting Steiner node having a high value of the centrality metric;
- adding connection with the lowest latency between the Steiner node and the terminal node from the terminal set P to the Steiner tree and adding the Steiner node to the terminal nodes; and
- testing if the constructed tree is spanning the network.

11. The method according to claim 10, wherein the Steiner node having the high value of the centrality metric contains a high betweeness centrality and is close to all the non terminal nodes, wherein the nodes of the network that are not in the terminal set P.

12. The method according to claim 11, wherein that the betweeness centrality is characterized by the following formula:

$$B(v) = \sum_{w:v \in P_s(w)} \frac{\sigma_{sv}}{\sigma_{sw}}(1 + \delta_s(w))$$

where the parameter $P_s(w)$ is the set of direct predecessors set of a given node w towards the sink node and it is obtained by graph traversal techniques; and $\sigma_{sv}$ and $\sigma_{sw}$ are respectively the number of shortest paths from the nodes v and w to the node s of the network, and $\delta_s(w)$ is the cumulative centrality metric of the node w on the path from a source,
the centrality metric is characterized by the following formula:

$$\lambda(v) \approx \sum_{\substack{w:v \in P_s(w) \\ w \in N(v)}} \frac{\sigma_{sv}}{d(v,w)\sigma_{sw}}(1 + \delta_s(w))$$

Where d (v, w) is the distance between the nodes v and w in the network.

13. An orchestrator for providing network orchestration for industrial communication system (ICS) with multiple network slices, being configured to:
- calculate centralities of nodes in the industrial communication system;
- group nodes with similar centralities of nodes into clusters;
- select cluster head for each cluster that is responsible for the resources allocation for the members of the cluster; and
- calculate centrality metric for cluster centralities, so as to orchestrate the industrial communication system,
wherein the cluster centralities are calculated as:
- mean of the betweeness centrality of the nodes of cluster;
- betweeness centrality of the node with the maximum closeness centrality to the nodes of the cluster;
- betweeness centrality of the cluster head; and/or
- betweeness centrality of the node connected to the neighboring cluster.

14. An industrial communication system with multiple network slices, comprising an orchestrator according to claim 13.

* * * * *